United States Patent

[11] 3,634,703

[72] Inventor  Tadao Kohashi
               Yokohama, Japan
[21] Appl. No. 758,834
[22] Filed     Sept. 10, 1968
[45] Patented  Jan. 11, 1972
[73] Assignee  Matsushita Electric Industrial Co., Ltd.
               Osaka, Japan
[32] Priorities Sept. 22, 1967
[33]           Japan
[31]           42/61358;
               Oct. 3, 1967, Japan, No. 42/64198; Oct. 3,
               1967, Japan, No. 42/64199; Oct. 3, 1967,
               Japan, No. 42/64200

[54] PULSE-GENERATING DEVICE
     8 Claims, 6 Drawing Figs.
[52] U.S. Cl. .................................................. 307/324,
               307/257, 307/258, 307/287, 307/298, 328/59
[51] Int. Cl. ................................................... H03k 1/00
[50] Field of Search ........................................ 307/324,
               285, 287, 258, 206, 257; 328/59; 317/298, 299

[56]                References Cited
                UNITED STATES PATENTS
3,116,426  12/1963  Oshima ........................ 307/257
                    FOREIGN PATENTS
1,156,849  11/1963  Germany ...................... 307/324

Primary Examiner—Donald D. Forrer
Assistant Examiner—David M. Carter
Attorney—Stevens, Davis, Miller & Mosher ABSTRACT: This specification discloses a pulse-generating device including elements exhibiting bistable voltage vs. current characteristics, wherein said elements are connected in series with each other and with a variable power source, and a load is connected between the junction of said elements and an intermediate voltage portion of said variable voltage source. In this device, sharp electric pulses can be applied between the opposite ends of the load by changing the voltage of said variable voltage source. By utilizing the principle of the present pulse generating device, it is possible to obtain a variety of novel solid-state devices such as light spot-scanning device, pickup device, luminescent indicator device and so forth.

PATENTED JAN 11 1972

INVENTOR
TADAO KOHASHI

BY

ATTORNEYS

INVENTOR
TADAO KOHASHI

BY

ATTORNEYS

PULSE-GENERATING DEVICE

This invention relates to a novel pulse-generating device using elements having bistable voltage vs. current characteristics.

It is a primary object of the present invention to provide a pulse-generating device including elements exhibiting bistable voltage vs. current characteristics, wherein said elements are connected in series with each other and with a variable voltage source, and a load is connected between the junction between said elements and an intermediate voltage portion of said variable voltage source.

Other objects, features and advantages of the present invention will become apparent from the following description taken in conjunction with the accompanying drawings, in which.

Figure 1:
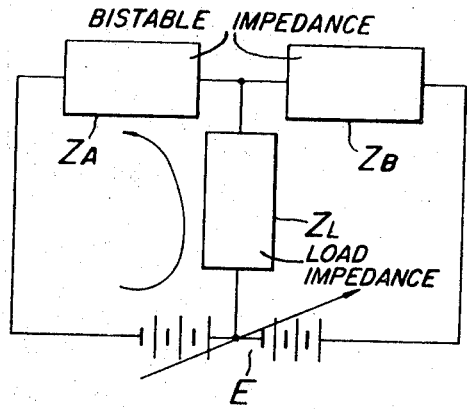
FIG. 1 is an electric circuit diagram showing the pulse-generating device according to an embodiment of the present invention.
Figure 2:
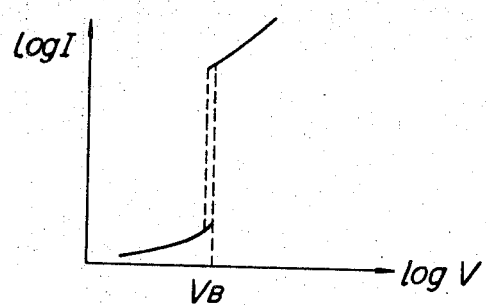
FIG. 2 is a view showing the current vs. voltage characteristics of CdSe.

Referring to FIG. 1 illustrating the principle of the present invention, E is a power source, and $Z_A$ and $Z_B$ are elements such for example as CdSe elements exhibiting bistable characteristics. As shown in FIG. 2, the current vs. voltage characteristic of such CdSe element is such that when a voltage lower than $V_B$ is applied thereto, it represents a high resistance so that only a small current is caused to flow therethrough and when a voltage higher than $V_B$ is applied thereto, the current flowing therethrough is suddenly increased. $Z_L$ represents a load which is a light-emitting element such for example as an electroluminescent element (referred to simply as EL). E denotes a power source which constitutes a bridge with the elements $Z_A$ and $Z_B$ to thereby prevent a current flow through the load $Z_L$.

Assume that the voltage required for reversing the state of the element $Z_A$ is $V_A$ and the voltage required for reversing the state of the element $Z_B$ is $V_B$, with $V_A<V_B$.

As the voltage of the power source E is increased, the element $Z_A$ is first operated so that another stable point or high-current stable point is reached. Thus, the equilibrium of the bridge is destroyed, with the result that a current flows through the load $Z_L$ in the direction indicated by an arrow. When the element $Z_A$ is operated or rendered conductive, a voltage about twice as high as the voltage which has previously been applied is imparted to the element $Z_B$, so that the latter is also operated to bring the bridge into the balanced state. Thus, the current is again prevented from flowing through the load $Z_L$.

In this way, a current is permitted to flow through the load $Z_L$ only for a short period of time from the point of time when the element $Z_A$ is operated to the point of time when the element $Z_B$ is operated, so that the EL element is enabled to emit light for a very short period of time. As a result, light pulses are available from the EL element $Z_L$.

As the bistable elements, use may be made of not only single elements such as CdSe elements, SCR's, gas discharge tubes or the like but also composite positive elements such as series positive light feedback amplifier elements constituted by a combination of EL elements and photoconductive elements or photo diodes or the like.

Figure 3:
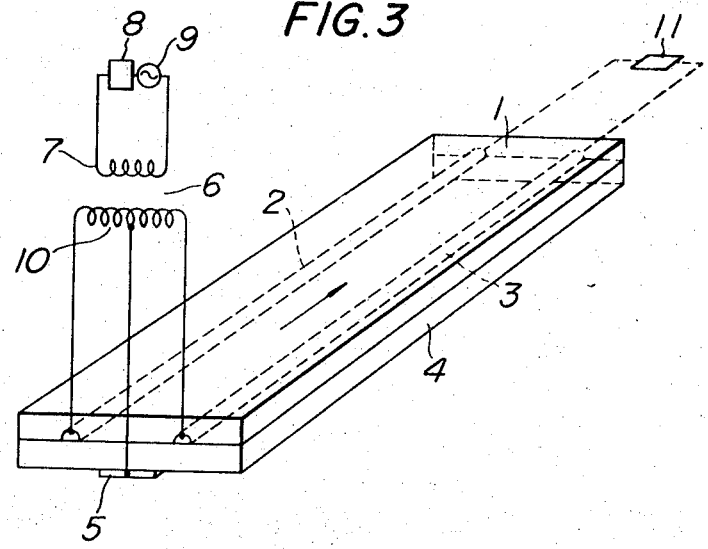
FIG. 3 is a perspective view showing the scanning plate of display panel embodying the present invention.

Referring to FIG. 3, there is shown the spot scanning plate of solid-state image display panel embodying the present invention, wherein the reference numeral 1 represents a CdSe plate having two resistance wires 2 and 3 embedded in the bottom portion thereof, 4 an EL plate, 5 a bandlike or wirelike nesa electrode provided at the center of the bottom surface of the EL plate 4 in such a manner that it is located intermediate between the resistance wires 2 and 3, and 6 a transformer having a scanning sawtooth wave signal source 8 and video signal source 9 to a primary winding 7 thereof. Secondary winding 10 of the transformer 6 is connected between one end of the resistance wire 2 and that of the resistance wire 3, and an intermediate point thereof is connected with the nesa electrode 5. Preferably, the resistance per unit length is made different between the resistance wires 2 and 3.

A section of the scanning plate forms a bridge circuit such as shown in FIG. 1 to which the power source 8 and 9 are connected through the longitudinal resistance wires 2 and 3. This equivalently corresponds to the case where the circuit as shown in FIG. 1 is longitudinally extended wherein the voltages required for the operation of the elements $Z_A$ and $Z_B$ becomes successively higher.

Upon application of a sawtooth wave voltage and video signal superimposed upon each other to the circuit from the primary side of the transformer 6, a current is caused to flow through the EL element 4 to emit light in that section of the CdSe element 1 to which the voltage necessary to reverse the state of the element 1 is applied. The voltage becomes successively higher in the direction indicated by an arrow due to the effect of the resistance wires 2 and 3, so that the light emitting or luminescent point is displaced in the direction indicated by the arrow. At the same time, the light emission intensity is modulated with the video signal occurring at that point of time. Thus, the scanning and intensity modulation of the point or dot are simultaneously effected.

By using such scanning plates as horizontal scanning lines and sequentially switching a multiplicity of such scanning plates arranged in juxtaposition with each other at a rate corresponding to the vertical scan, it is possible to obtain a solid-state image display device. With such arrangement, the response speed is so high that high-speed scan can be achieved.

In the foregoing, description has been made of the case where the field imparted to the bistable elements is longitudinally varied with a predetermined gradient with the aid of the resistance wires. However, it is possible that the resistance wires are replaced with bandlike or wirelike conductors and either the spacing between the conductors or the characteristic of each element is varied lengthwise As described above, in accordance with the foregoing embodiment of this invention, very steeply rising light pulses are available from respective luminescent points so that high-speed scan can be achieved. Thus, application of the present invention to an image display device results in a moving image being displayed.

Figure 4:
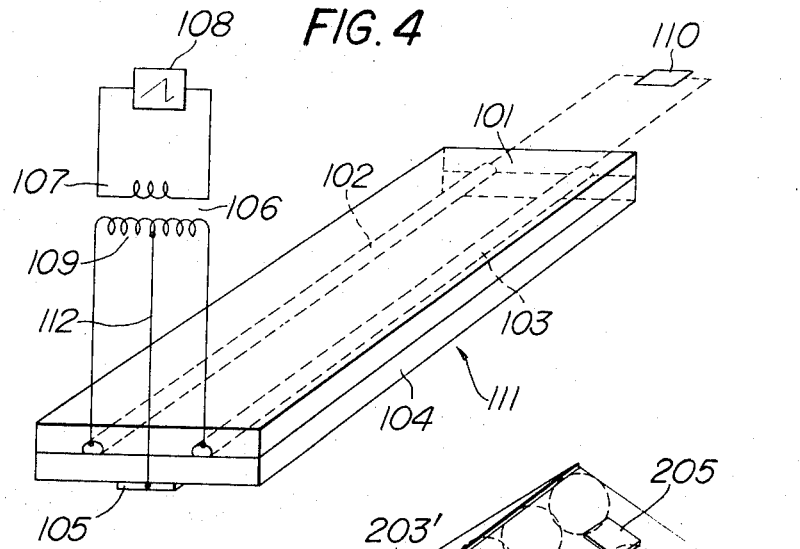
FIG. 4 is a perspective view showing a pickup tube embodying the present invention.

FIG. 4 shows a pickup panel constructed on the basis of the similar principle. Description will be made of a portion corresponding to one horizontal scan. The reference numeral 101 represents a bistable CdSe plate having two parallel resistance wires 102 and 103 embedded in the bottom portion thereof. The reference numeral 104 denotes a photoconductive plate made of CdSe or a similar material, 105 a nesa electrode provided on a surface of the photoconductive plate 104 intermediate between the resistance wires 102 and 103, and 106 a transformer having a primary winding 107 connected with a sawtooth wave signal source 108. Secondary winding 109 of the transformer is connected between one end of the resistance wire 102 and that of the other resistance wire 103, and an intermediate point thereof is coupled to one end of the nesa electrode 105.

Irradiation of light rays 111 onto the photoconductive plate 104 results in resistance distribution corresponding to the intensity of the light rays irradiated at various points in the direction of the length of the photoconductive plate 104.

By applying a sawtooth wave voltage to the primary winding 107 of the transformer 106, a current flowing through the photoconductive plate 104 in the direction of the thickness thereof is sequentially moved in the direction of the length of the plate 104, so that the current is modulated with light input to each point. Thus, it is possible to take from an intermediate arm 112 variations in the light input with position as variations in the current with time.

A pickup device can be constructed by arranging a multiplicity of such pickup plates, which are switched at a period corresponding to the vertical scan.

In the foregoing, description has been made of the case where the operating voltage characteristic is longitudinally varied in accordance with the longitudinal resistance of the resistance wires. It is also possible that the resistance wires are replaced with conductors and either the spacing therebetween or the characteristic per se of the element is longitudinally varied.

With the foregoing embodiment of the present invention, pulses with very short rise time can be produced at respective sections in the scanning direction, and the pulse currents are modulated with light rays so that the resulting image can be prevented from being blurred. Thus, a pickup device with high resolution can be obtained.

Corrections for the voltage gradient and impedance matching can be effected by connecting impedance element 11 or 110 across the resistance wires 2 and 3 or resistance wires 102 and 103 in FIGS. 3 and 4.

Figure 5:
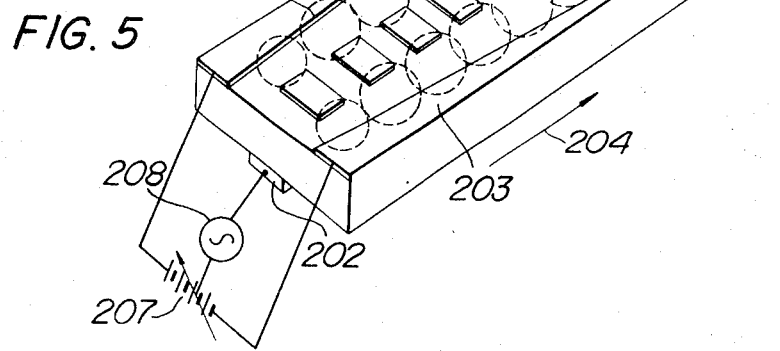
FIG. 5 is a perspective view showing a luminescent display device embodying the present invention.
Figure 6:
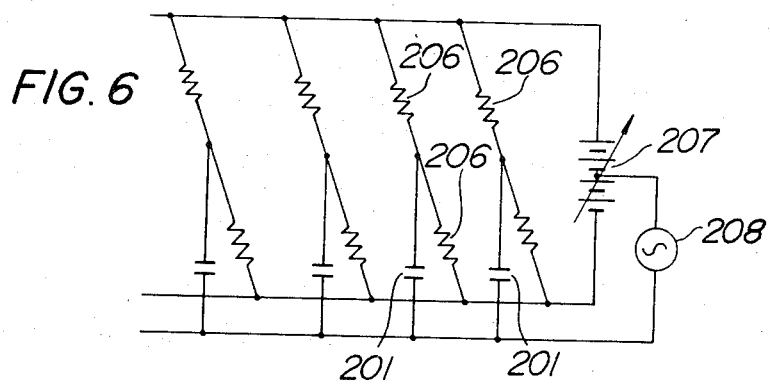
FIG. 6 is a view showing an equivalent circuit thereof.

FIG. 5 shows a voltage indicating device constructed based on the principle of the present invention, wherein the reference numeral 201 represents an EL plate having a wirelike or bandlike nesa electrode 202 provided at the center of the rear surface thereof. The reference numerals 203 and 203' denote aluminum electrodes attached to the side edge portions of the EL plate 201, with the width of each aluminum electrode being gradually decreased in the direction indicated by an arrow 204. The reference numeral 205 indicates electrodes arranged on a straight line in longitudinally spaced relationship to each other and in opposing relationship to the nesa electrode 202, and 206 elements each of which has bistable voltage vs. current characteristics or nonlinear resistance elements such for example as CdSe a current flowing through which is suddenly increased upon application of an electric field higher than a predetermined value thereto. The reference numeral 207 represents a DC power source connected between the electrodes 023 and 203', and 208 an AC power source connected between the intermediate portion of the DC power source and the nesa electrode 202 to energize the EL plate 201. FIG. 6 shows an equivalent circuit of this device. Each section of the device constitutes a bridge, wherein the spacing between the electrodes 203, 203' and 205 is gradually increased in the direction indicated by an arrow 204. Therefore, the voltage required for rendering the elements 206 conductive becomes gradually higher in the direction indicated by the arrow 204. As the voltage increases, the CdSe elements 206 which are in the nonconducting state at a low voltage are rendered conductive. In this case, the electrodes between the elements 206 serve as high-potential electrodes. By increasing the voltage of the power source 207, the CdSe elements 206 are sequentially energized so as to be rendered conductive so that the electrodes 205 are made to serve as high-potential electrodes sequentially in the direction indicated by the arrow 204. Thus, the light emission range of the EL plate 201 depends upon the voltage of the power source 207, so that the voltage can be indicated in accordance with the position of the border between the light emitting area and the nonemitting area of the EL plate 201. In this embodiment, when the CdSe elements 206 are reversed so as to be rendered conductive, a current continues to flow through the load from the AC power source even if the voltage is further increased, with the result that the light-emitting range of the EL plate tends to be gradually extended. Another operating method is such that the voltage of the power source 207 is fixed and the voltage of the power source 208 is varied. Similar luminescent display can be achieved also by changing the voltage of the power source 208, with the power source 207 eliminated. This is especially effective to simplify the device. Tuning indication of a received wave in a radio receiver, television receiver or the like can be effected by the use of an AGC voltage or a voltage related thereto as at least either one of the power sources 207 and 208. Furthermore, in a radio receiver or the like in which a voltage-controlled variable reactance element or current-controlled variable reactance element is inserted in the tuning circuit to thereby electronically sweep a received frequency, luminescent indication of the received frequency can be effected by using as at least either one of the power sources 207 and 208 a voltage corresponding to or related to a current or voltage imparted to the variable reactance element.

As described above, the light-emitting area is variable depending upon the amplitude of an input signal, so that the magnitude of a signal voltage or current can be indicated very clearly.

What is claimed is:

1. A pulse-generating device comprising a pair of bistable elements having current-stable characteristics, the transient voltages of said bistable elements being different form each other; a power source which provides a varying output voltage, said power source having a midpotential terminal; said bistable elements being connected in series across said power source; a load being connected between the junction point of said elements and said midpotential terminal of said power source.

2. A pulse-generating device comprising a pair of bistable elements having current stable characteristics, the transient voltages of said bistable elements being different from each other; a power source which provides a varying output voltage, said power source having a midpotential terminal; said bistable elements being connected in series across said power source; a load being connected between the junction point of said elements and said midpotential terminal of said power source, wherein said pair of bistable elements comprises a solid-state bistable strip, a pair of electrodes disposed along the longitudinal edges of said bistable strip, one end of each electrode being connected with each end of said power source, and a third electrode connected with said midpotential terminal of said power source and disposed along said bistable strip with a solid-state load substance interposed therebetween, said pair of electrodes and said third electrode being arranged such that the intensity of an electric field produced between each of said pair of electrodes and said third electrode varies at a predetermined gradient along the length of said strip with the distance from one end thereof.

3. A pulse-generating device as defined in claim 2, wherein said pair of electrodes are formed of electric resistance wires.

4. A pulse-generating device as defined in claim 3, wherein each end of said resistance wires other than the end connected with the power source is connected with each end of an impedance element.

5. A pulse-generating device as defined in claim 2, wherein said pair of electrodes are disposed in a manner that the distance between them gradually increases along the length of said electrodes and an array of conductive pieces are provided in said bistable strip along and between said pair of electrodes and opposite to said third electrode.

6. A pulse-generating device as defined in claim 2, wherein said load substance comprises a strip of an electroluminescent material and said power source supplies a sawtooth voltage superimposed with an AC signal.

7. A pulse-generating device as defined in claim 2, wherein said load substance comprises a strip of a photoconductive material and said power source supplies a sawtooth voltage.

8. A pulse-generating device as defined in claim 2, wherein said load substance comprises a strip of an electroluminescent material.

* * * * *